United States
Helmuth

[15] 3,654,804
[45] Apr. 11, 1972

[54] STABILIZATION OF MULTIPLE SHAKER SYSTEMS

[72] Inventor: James G. Helmuth, Monrovia, Calif.
[73] Assignee: Chadwick-Helmuth Electronics, Inc., Monrovia, Calif.
[22] Filed: Apr. 8, 1970
[21] Appl. No.: 26,602

Related U.S. Application Data

[63] Continuation-in-part of Ser. No. 606,657, Jan. 3, 1967, abandoned.

[52] U.S. Cl. ............................73/71.6, 318/37, 318/128
[51] Int. Cl. .......................................................G01m 7/00
[58] Field of Search ..........................73/71.5, 71.6, 67.2, 67; 318/37, 127, 128, 132

[56] References Cited

UNITED STATES PATENTS

| | | | |
|---|---|---|---|
| 2,844,777 | 7/1958 | Ross | 318/127 |
| 2,853,667 | 9/1958 | Booth et al. | 318/127 |
| 2,950,619 | 8/1960 | Schuerch | 73/67.2 |
| 2,964,272 | 12/1960 | Olson | 248/19 |
| 3,015,948 | 1/1962 | Kearns | 73/67.2 |

Primary Examiner—Richard C. Queisser
Assistant Examiner—John P. Beauchamp
Attorney—White, Haefliger & Bachand

[57] ABSTRACT

The problem of multiple shaker system instability due to cross-coupling of shaker drives via the load is significantly reduced by furnishing a bias signal which is a function of force application to the load via at least one shaker, and by applying the bias signal to bias the vibratory drive applied to the load via another shaker. The amplitude and phase of the bias signal are also controllable to effect reduction of instability.

10 Claims, 9 Drawing Figures

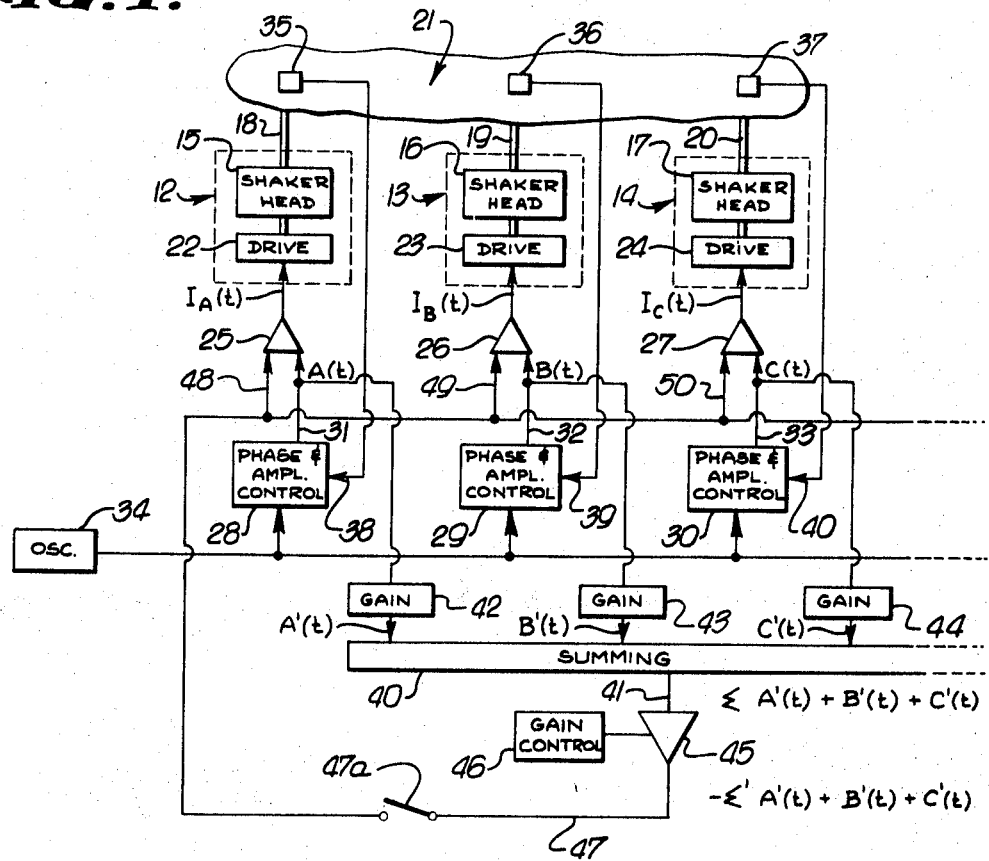

INVENTOR.
JAMES G. HELMUTH
BY
White, Haefliger & Bachand
ATTORNEYS.

STABILIZATION OF MULTIPLE SHAKER SYSTEMS

This application is a continuation in part of my earlier application, Ser. No. 606,657, filed Jan. 3, 1967, now abandoned.

This invention relates generally to multiple shaker control systems, and more particularly concerns stabilization of such systems.

In vibration testing of test specimens it is often-times desired to use more than one shaker to excite a single specimen, as for example where the objective is to achieve a desired vibration level. As an example, certain advantageous multiple vibration exciter control systems are disclosed in my co-pending application for U.S. Letters Patent entitled, "MULTIPLE SHAKER CONTROL SYSTEM," Ser. No. 506,330, filed Nov. 4, 1965, now U.S. Pat. No. 3,477,281.

In multiple shaker systems of the type with which the present invention is concerned, control of the phase and amplitude of the input to each shaker is accomplished by detecting the in-phase and quadrature components of the vibration pickup associated with each shaker drive point. The in-phase component is adjusted automatically by the amplitude control system, or ACS; thus, the ACS increases the shaker drive input to the load if the in-phase component is too small and vice versa. In addition, a phase control system (PSC) utilizes the quadrature component detected by the pickup to cause the drive phase angle to become more leading (advances) if the pickup phase angle is lagging (retarded) and vice versa. However, in certain cases, as for example resonant or tightly coupled structures, instability and failure can occur when the vibration pickup at a station is influenced to substantial extent by the drive to the load from exciter or shaker heads other than the head associated with that pickup.

It is a major object of the present invention to provide method and apparatus for overcoming the instability problem defined above. Basically, the method of the invention involves furnishing a particular bias or stabilizing signal which is a function of the force supplied to the load via at least one of the shakers, and applying that signal to bias the vibratory drive applied to the load via another of the shakers, the amplitude and phase of the bias signal being such as to effect reduction of system instability. In one example, for the case where the shakers are substantially uniform and the transfer functions from the exciters to their corresponding control points are nearly identical, the bias signal may be furnished by deriving a summed version of multiple drive signals transmitted from multiple drives to multiple shakers, and inverting the phase of that summed version. By such summing, it becomes possible to use and adjust one gain control to achieve stability at any frequency.

As another example, for the case of a load structure and test set-up so non-uniform that the above referred to transfer functions are substantially different, the bias or stabilizing signal may be derived by recording the in-phase and quadrature components of the drive signals to one shaker as a function of frequency. Thereafter, the recorded signal is played back to bias the drive applied to the load via the other shaker, or other shakers. Such recordings may for example take the form of tape recordings, as will be described.

It is a still further object to provide circuit apparatus for performing the stabilizing functions referred to above.

These and other objects and advantages of the invention, as well as the details of illustrative embodiments, will be more fully understood from the following detailed description of the drawings, in which:

FIG. 1 is a circuit diagram showing one preferred embodiment of the invention;

FIG. 2a – 2d are vector diagrams;

Figure 3:
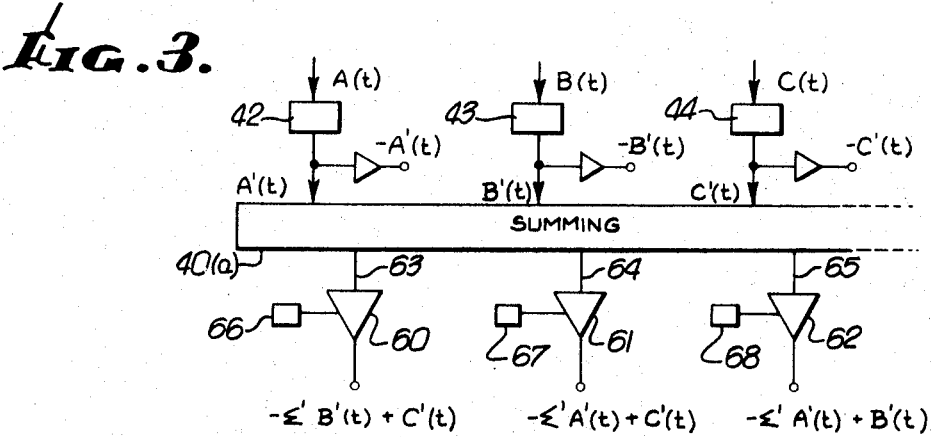
FIG. 3 is a circuit diagram showing another embodiment of the invention.

Referring first to FIG. 1, multiple shakers or exciters are indicated at 12–14, having heads 15–17 coupled at 18–20 to the specimen or load 21. The shakers also include drives 22–24 to which cyclic current of indicated amplitudes is transmitted as follows:

$$I_A(t) = I_A (\sin \omega t + \phi_A) \quad (1)$$
$$I_B(t) = I_B (\sin \omega t + \phi_B) \quad (2)$$
$$I_C(t) = I_C (\sin \omega t + \phi_C) \quad (3)$$

The power amplifiers 25–27 respectively supply the above drive current.

Phase and amplitude controls for the power amplifiers are indicated at 28–30, with outputs at 31–33. These controls receive frequency input $\omega$ from the master oscillator 34, and they may be of the type described at 90 in the above mentioned copending Helmuth application for U.S. Letters Patent, now U.S. Pat. No. 3,477,281, Ser. No. 506,330. In general, the intended function of the controls is to control the phase relationships of the cyclic currents, and their relative amplitudes, so as to substantially optimize the efficiency of vibration drive of the load 21 as described in that prior application. Note in this regard the vibration pick-ups such as accelerometers 35–37 connected to the load at points near their respective associated shakers. Each pick-up detects the amplitude of the motion of the load at or near its associated shaker drive point, and the pick-ups produce corresponding signals fed back to the controls via leads 38–40, to be used for amplitude control of the respective shakers.

As previously mentioned, in the case of resonant, tightly coupled structures, whenever the vibration pickup at a station (say pickup 35) is influenced by the drive from exciter heads other than the one which it controls (say the drive from shakers 16 and 17), instability and failure of control can occur. This is obviated in accordance with the invention by furnishing a bias or stabilizing signal which is a function of the vibratory drive applied to the load via at least one of the shakers, and by applying that signal to bias the vibratory drive applied to the load via another of the shakers, the amplitude and phase of the bias signal being such as to effect reduction of system instability.

In the FIG. 1 example, versions $A(t)$, $B(t)$ and $C(t)$ of the electrical drive signals to the shakers 12–14 are summed at 40 to provide the signal $\Sigma A'(t) + B'(t) + C'(t)$ at point 41. In this regard, the versions $A'(t)$, $B'(t)$ and $C'(t)$ may be derived from $A(t)$, $B(t)$ and $C(t)$ by means of gain controls or independently adjustable amplifiers indicated at 42–44. The sum signal at 41 is next inverted at amplifier 45 having a gain control at 46, to produce the bias signal $-\Sigma A'(t) + B'(t) + C'(t)$ at point 47. The latter signal is then applied to the inputs 48–50 of all the power amplifiers 25–27 to be superposed upon the respective inputs at 31–33. By virtue of the inversion of the bias signal at 45, and by virtue of independent adjustment of one or more of the gain controls 42–44 and 46, the amplitude and phase of the bias signal are found to be such as to effect reduction of system instability,. Note that any of the gains at 42–44 may be independently reduced to zero. Stability may thus be achieved over a range of oscillator inputs (shaker frequencies) by adjustment of gain over that range. Once so determined, gain may be programmed as a function of oscillator input, the elements 42–44 and 46 also representing such programming.

By way of further explanation of the above phenomenon, reference is made to FIGS. 2a – 2d. Considering FIG. 2a, vector 50 represents the amplitude and phase of the drive input to the load from shaker 12, whereas vector 51 represents other input to that portion of the load proximate shaker 12, due to cross-coupling of other shakers. The resultant input vector is seen at 52. In FIG. 2b the amplitude of vector 51 has increased to such undesirable extent that vector 50 has the wrong "sense," i.e. has a negative component, representing power removed from the load via shaker 12. This represents a system unstable condition, which the invention seeks to remedy.

As implied above, the approach or occurrence of a non-stable condition may be suitably indicated, as is conventional. For example, a light in control 28 may come on, or a meter in 28 may indicate a change in output 31, in the event of such condition. The same applies to controls 29 and 30.

FIG. 2c shows the furnishing or generation of an additional vector $50(a)$ which, added to vector $50(b)$ produce vector 50 of FIG. 2b. Vector $50(a)$ represents shaker 12 input due to signal 47 (applied at 48) and vector 50(b) represents shaker 12 input due to signal 31 from control 28. Vector 50(a) is typically generated to have angularity such as always to provide a component in opposition to the desired vibration, ideally 180° out of phase with vector 52 (the resultant vibration level). The amplitude and direction of vector 50(a) are such that vector 50(b) will always be directed to the right, i.e. will not have a negative component. In the example of FIG. 1 vector 50(a) is represented by the bias signal developed at 47, it being assumed that the drives from the various shakers to the load are nearly equal. In FIG. 2d the vectors 50(a), 51 and 50(b) add to produce the vector 52, corresponding to a stable condition due to forward direction of 50(b). The operator may enable the bias signal application by closing of the switch 47a in lead 47 when he sees the light referred to above come on.

FIG. 3 shows another form of bias signal development, wherein various bias signals $-A'(t)$, $-B'(t)$, $-C'(t)$ are provided. Also, bias signals $-\Sigma B'(t) + C'(t)$, $-\Sigma A'(t) + C'(t)$ and $-\Sigma A'(t) + B'(t)$ are provided by the inverting amplifiers 60–62, having inputs 63–65 from the summing apparatus and also having gain controls 66–68. In this regard, the various bias signals may be selectively and independently fed to the power amplifiers as checked in the following:

TABLE

| Bias Signal | Power Amplifier 25 | 26 | 27 |
| --- | --- | --- | --- |
| $-A'(t)$ | | * | * |
| $-B'(t)$ | * | | * |
| $-C'(t)$ | * | * | |
| $-\Sigma B'(t)+C'(t)$ | * | | |
| $-\Sigma A'(t)+C'(t)$ | | * | |
| $-\Sigma A'(t)+B'(t)$ | | | * |

Figure 4:
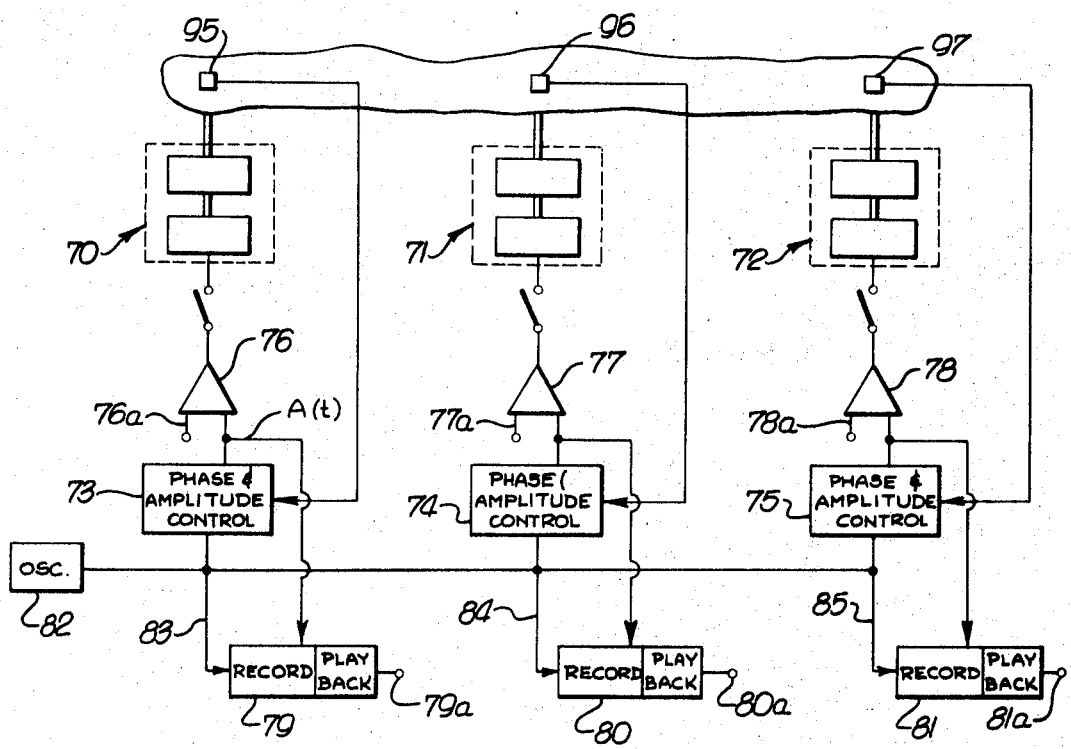
FIGS. 4–6 are circuit diagrams showing still other forms of the invention.

In the case of a structure and test set-up characterized as substantially non-uniform as regards loading imposed on the different shakers, the bias signal may be furnished by recording the drive signal to one shaker, and the thus recorded signal may be played back for application as a stabilizing signal. For example, in FIG. 4, shaker 70 may be driven by itself with shakers 71 and 72 being shut-down, the output at 95 being controlled at desired phase and amplitude by adjustment of the phase and amplitude control 73, as for example in response to feed back from pickup 95 in the manner as previously described in FIG. 1. A version $A(t)$ of the drive signal from the control 73 to the power amplifier 76 may be recorded at 79, as a function of frequency of master oscillator 82, the recorder having oscillator input at 83. Specifically, the in-phase and quadrature components of $A(t)$ may be so recorded, the recorder for example being a drum or linear type X–Y device with curve follower capability (two channel). In the same manner shaker 71 may be driven with shakers 70 and 72 shut down, and a recording of the stabilizing signal made at 80; and shaker 72 may be driven with shakers 70 and 71 shut down and a stabilizing signal recorded at 81. The signal recorded at 79 incorporates the influence of the connections of the shakers 71 and 72 to the load upon the detector 95 associated with shaker 70; the signal recorded at 80 incorporates the influence of the connection of shakers 70 and 72 to the load upon the detector 96 associated with shaker 71; and the signal recorded at 81 incorporates the influence of the connection of the shakers 70 and 71 to the load upon the detector 97 associated with shaker 72. In this regard, when shaker 70 is driven with shakers 71 and 72 shut down, the shaker drive to the load corresponds to vector 50 in FIG. 2b and the reactive force influence of the shut down shakers on the detector 95 corresponds to vector 51 in FIG. 2b. The signal recorded at 79, properly inverted, corresponds to generation of vector 50(a) seen in FIG. 2c. Finally, the playback of the recorded signal to the drive 76 corresponds to FIG. 2d, with vectors 50(a), 51 and 50(b) adding to produce vector 52, a stable condition.

Thereafter playback terminal 79a of recorder 79 may be connected to stabilizing input terminal 76a of amplifier 76; playback terminal 80a of recorder 80 may be connected to stabilizing input terminal 77a of amplifier 77; and playback terminal 81a of recorder 81 may be connected to stabilizing input terminal 78a of amplifiers 78. The system is then operated with all shakers running and the stabilizing signals applied to the amplifiers as described, with their levels predetermined as functions of oscillator frequency. As before, the various stabilizing signals may be phase inverted if necessary to subtract from the drive inputs to the amplifiers 76–78. The resultant difference signals are used to control the shakers.

Figure 5:
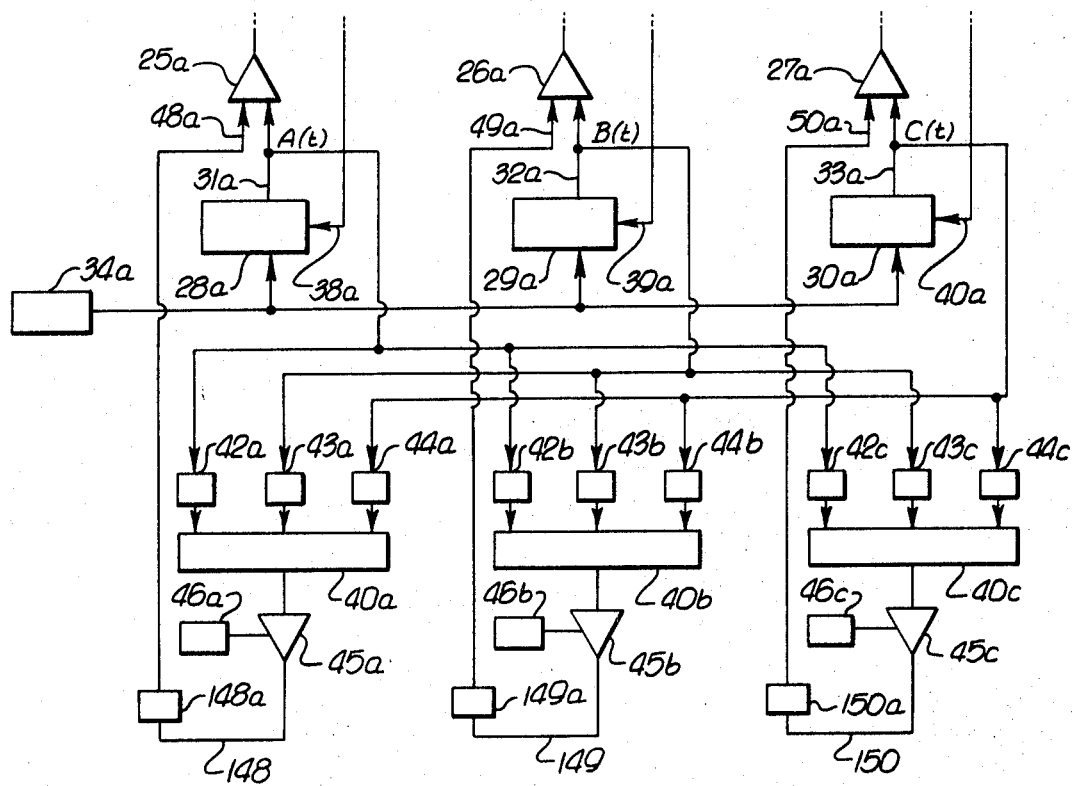

FIG. 5 shows a system like that of FIG. 1, but incorporating modifications in the generation of the bias signals. Elements 25a–34 correspond to elements 25–34 in FIG. 1; and the elements above the amplifiers 25a–27a which are not shown are the same as in FIG. 1 with the exception that the load may not be symmetrical. Versions $A(t)$, $B(t)$ and $C(t)$ of the electrical drive signals to the shakers are fed to each of three groups of gain controls, i.e. group 42a, 43a and 44a, groups 42b, 43b, 44b, and 42c, 43c and 44c. The outputs from those controls are respectively summed at 40a, 40b and 40c, and inverted at amplifiers 45a, 45b and 45c having gain controls 46a, 46b and 46c. The outputs at 148, 149 and 150 are then respectively applicable, via controls 148a, 149a and 150a as inputs 48a, 49a and 50a to the power amplifiers 25a, 26a and 27a, when approaching instability is detected, as described above. This permits separate adjustment of the gains associated with production of the bias signals 48a, 49a and 50a to effect reduction of system instability under non-symmetrical drive conditions as respects the load. Controls 148a, 149a and 150a comprise computer memory and programming circuitry enabling on-line or delayed application of the bias signals as described.

Figure 6:
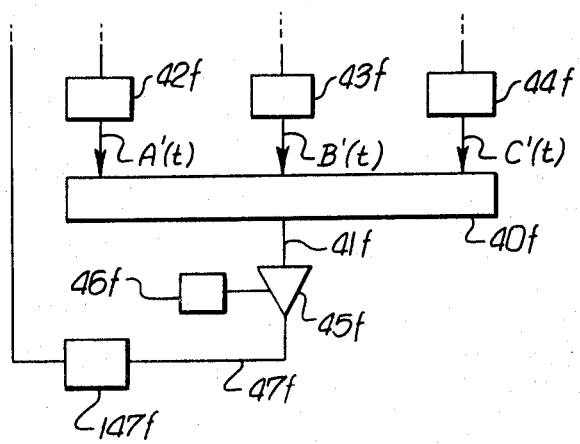

FIG. 6 illustrates elements 40f–47f corresponding respectively to elements 40–47 in FIG. 1 (and also to similar elements in FIG. 5); however, in this instance the elements 42f–44 incorporate independently adjustable phase as well as gain controls. The summing means 40f accordingly sums the X and Y components of the vectors defined by the outputs $A'(t)$, $B'(t)$ and $C'(t)$, in deriving the bias signal. Here again the purpose is to provide electrical compensation for unsymmetrical loading of the structure being driven, as where the drive couplings to the load are not equally spaced apart, or the load geometry varies along its length, the overall purpose being to achieve stability. Bias signal 47f is applied to the memory of computer 147f, and may be applied, under the control of programming in the computer, to bias one or more of the power amplifiers as in FIGS. 1 and 5.

I claim:

1. In the method of stabilizing a system of multiple shakers and drives therefor operatively connected with a load and wherein the load couples energy delivery between the shakers acting to unstabilize the system, said drives including phase and amplitude control, the steps that include
   a. detecting the amplitude of load motion near the locus of force application to the load via said one shaker,
   b. controlling one phase and amplitude control associated with one shaker drive in response to said detection for controlling the amplitude of the output of said one shaker,
   c. furnishing a bias signal derived from the output of said one control, said furnishing being carried out with accompanying amplitude control and phase shift of said bias signal, and
   d. applying said signal to bias the vibratory drive applied to the load via another of said shakers.

2. The method of claim 1 wherein said bias signal is derived as an additive function of the drives applied to the load via multiple shakers including said one shaker.

3. The method of claim 1 wherein said furnishing step includes deriving a summed version of multiple oscillatory drive signals transmitted from multiple drives to multiple shakers.

4. The method of claim 3 wherein said furnishing step includes inverting the phase of said summed version thereby to derive said bias signal.

5. In the method of stabilizing a system of multiple shakers and drives therefor connected with a load and wherein the load couples energy delivery between the shakers acting to unstabilize the system, said drives including phase and amplitude control, the steps that include
 a. detecting the amplitude of load motion near the locus of force application to the load via said one shaker,
 b. controlling one phase and amplitude control associated with one shaker drive in response to said detection for controlling the amplitude of the output of said one shaker,
 c. furnishing and recording a bias signal derived from the output of said one control, and
 d. operating all of the shakers and playing back said recorded bias signal to bias the vibratory drive applied to the load via said one shaker.

6. In apparatus for stabilizing a system of multiple shakers and vibratory drives therefor operatively connected with a load and wherein the load couples energy delivery between the shakers acting to unstabilize the system, said drives including phase and amplitude control, the improvement which comprises
 a. transducer means for detection of the amplitude of load motion near the locus of force application to the load via said one shaker,
 b. feed-back means responsive to said detecting means for controlling one phase and amplitude control associated with one shaker drive for controlling the amplitude of the output of one shaker,
 c. primary means furnishing a bias signal derived from the output of said one control, said primary means including means to vary the amplitude of the bias signal and to effect a greater than 90° phase shift of the bias signal, and
 d. secondary means to apply said signal to bias the vibratory drive applied to the load via another of said shakers.

7. The apparatus of claim 6 wherein said primary means includes a control network connected to sum versions of the drives applied to the load via multiple shakers.

8. In apparatus for stabilizing a system of multiple shakers and vibratory drives therefor connected with a load and wherein the load couples energy delivery between the shakers acting to unstabilize the system, said drives including phase and amplitude control, the improvement which comprises
 a. transducer means or detecting the amplitude of load motion near the locus of force application to the load via said one shaker,
 b. feed-back means responsive to said detecting means for controlling one phase and amplitude control associated with one shaker drive for controlling the amplitude of the output of one shaker,
 c. primary means furnishing and recording a bias signal derived from the output of said one control,
 d. secondary means to apply said recorded signal to bias the vibratory drive applied to the load via said one shaker.

9. The method of claim 3 wherein said furnishing step includes adjusting the phases of said drive signals prior to said derivation of said summed version, said bias signal being applied via a computer memory.

10. The method of claim 3 including
 a. controlling another phase and amplitude control associated with another shaker drive in response to the detection of the amplitude of load motion near the locus of force application to the load via said other shaker for controlling the amplitude of the output of said other shaker,
 b. furnishing another bias signal by deriving another summed version of multiple oscillatory drive signals transmitted from multiple drives to multiple shakers, and
 c. applying said other bias signal, via a computer memory, to bias the vibratory drive applied to the load via said one shaker.

* * * * *